(12) United States Patent
Huebler

(10) Patent No.: US 8,358,120 B2
(45) Date of Patent: Jan. 22, 2013

(54) NON-INTRUSIVE DETECTION OF LIVE ELECTRICAL LINES

(75) Inventor: James Emerson Huebler, Brookfield, IL (US)

(73) Assignee: Operations Technology Development, NFP, Des Plaines, IL (US)

( * ) Notice: Subject to any disclaimer, the term of this patent is extended or adjusted under 35 U.S.C. 154(b) by 329 days.

(21) Appl. No.: 12/857,601

(22) Filed: Aug. 17, 2010

(65) Prior Publication Data

US 2012/0043960 A1    Feb. 23, 2012

(51) Int. Cl.
*G01R 19/00*    (2006.01)

(52) U.S. Cl. .......................................... 324/67; 324/326

(58) Field of Classification Search ................ 324/66, 324/67, 326
See application file for complete search history.

(56) References Cited

U.S. PATENT DOCUMENTS

| | | | | |
|---|---|---|---|---|
| 4,387,340 A * | 6/1983 | Peterman | ...... | 324/326 |
| 4,639,674 A * | 1/1987 | Rippingale | ...... | 324/326 |
| 5,438,266 A * | 8/1995 | Tsang | ...... | 324/326 |
| 6,140,819 A * | 10/2000 | Peterman et al. | ...... | 324/326 |
| 6,356,082 B1 * | 3/2002 | Alkire et al. | ...... | 324/326 |
| 2011/0249122 A1 * | 10/2011 | Tricoukes et al. | ...... | 348/158 |

* cited by examiner

*Primary Examiner* — Vincent Q Nguyen
(74) *Attorney, Agent, or Firm* — Mark E. Fejer

(57) ABSTRACT

A method for determining a presence of live 3-phase electrical lines inside a buried pipe or conduit from outside the pipe or conduit and preferably from an above ground location. A sensor suitable for detecting vibratory signals is placed on the ground proximate the location of the buried pipe. The sensor is then used to determine the presence of a current frequency signal and a current harmonic frequency signal, whereby presence of the current frequency signal and/or the current harmonic frequency signal corresponds to a presence of a live 3-phase electrical line within the buried pipe or conduit. Although intended primarily for use in connection with buried pipes, the method may also be employed on exposed pipes and conduits.

14 Claims, 5 Drawing Sheets

NON-INTRUSIVE DETECTION OF LIVE ELECTRICAL LINES

BACKGROUND OF THE INVENTION

1. Field of the Invention

This invention relates to a method and apparatus for detecting the presence of live 3-phase electrical lines, one electrical line for each phase, inside a buried pipe without penetrating the pipe wall.

2. Description of Related Art

Buried high-voltage, 3-phase electrical lines are frequently installed inside pipe that is the same as or similar to pipe utilized for natural gas transmission and distribution. Voltages may be as high as 70,000 volts. Normal practice of the electric utility is to fill the space between the electrical lines and the inner pipe wall surface with either a dielectric fluid or nitrogen gas, typically at 200 psig. Because the pipes used to contain the 3-phase electrical lines are visually indistinguishable from the pipes used for natural gas transmission and distribution, some method for distinguishing between the pipes without penetrating the pipe walls is necessary. Presently, when such pipes are buried near each other, utility maps and electromagnetic pipe locators are used to identify which pipe is which. However, the results of these methods are sometimes incorrect. As a result, incidents have occurred where a pipe containing electrical lines has been drilled into by utility crews intending to attach a new service to a gas main. The potential for tapping into misidentified, electrically energized pipelines causes undue risks and hazards to employees, the general public, and the environment.

At present, there are no acceptable tools for determining pipe contents from outside the pipe. Drill holes can be made, but doing so is hazardous because the pipe contents are under pressure and live electrical cables may be inside. X-ray inspection to detect electrical cables has been tried, but such technique does not provide an indication as to whether the electrical cables are live. In addition, the use of X-ray equipment in the field is not an acceptable solution for utility companies.

The most efficient transmission of electricity occurs when the three electrical lines are twisted around each other and the current flows in each line are balanced with the proper phases to cancel the electric and magnetic fields outside of the pipe carrying the electric lines. However, balanced currents means that techniques for identifying the utility of the pipe that measure electric and magnetic fields are not effective. Thus, it is apparent that an easy to use, inexpensive, externally applied tool is needed to detect electrical cables inside a pipe.

SUMMARY OF THE INVENTION

It is one object of this invention to provide a non-intrusive method for determining the presence of live 3-phase electrical lines within a pipe or conduit.

It is one object of this invention to provide a method for determining the presence of live 3-phase electrical lines in a buried pipe or conduit from an above ground location.

It is one object of this invention to provide a method for differentiating between a gas utility pipeline and a pipe containing live 3-phase electrical lines.

These and other objects of this invention are addressed by a method for determining a presence of live 3-phase electrical lines inside a buried pipe in which the location of the buried pipe is determined from an above ground location. A sensor suitable for detecting vibratory signals is placed on the ground proximate the location of the buried pipe. The sensor is then used to determine the presence of a current frequency signal and a current harmonic frequency signal, whereby presence of the current frequency signal and/or the current harmonic frequency signal corresponds to a presence of a live 3-phase electrical line within the buried pipe or conduit.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
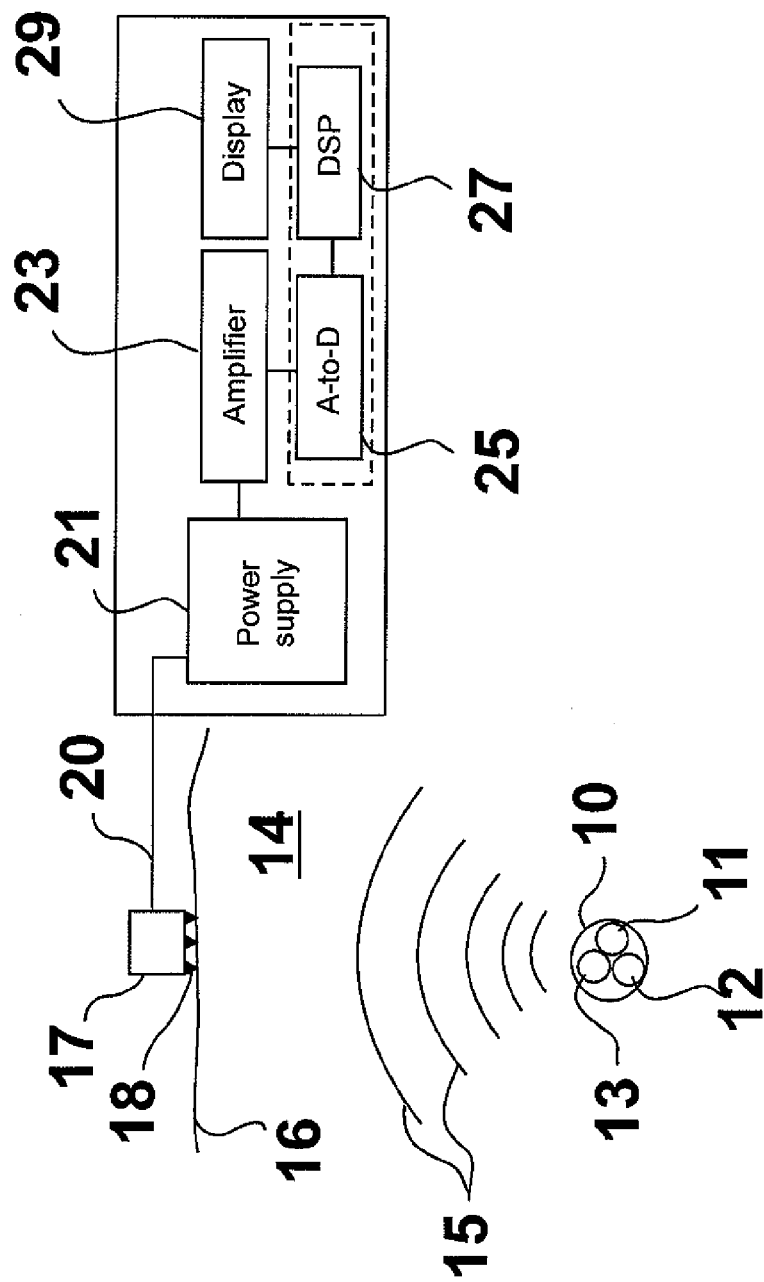
FIG. 1 is a schematic diagram of a system for detecting vibrations from a live 3-phase electrical in accordance with the method of this invention.

FIG. 1 is a schematic diagram of a system for non-intrusive detection of live electrical lines disposed within a pipe buried in the ground. As shown therein, a pipe 10 containing three electrical lines 11, 12, 13, one for each of the three phases, is buried in the ground 14. The space between the electrical lines and the inner pipe wall is filled with a dielectric fluid or nitrogen gas typically at 200 psig. Vibrational detection of a live electrical cable in accordance with the method of this invention works with both nitrogen filled and mineral oil filled pipes or conduits. The lines are twisted about each other to minimize electric and magnetic fields. Even in cases where the currents and phases are perfectly balanced to minimize the electric fields outside the pipe, the alternating currents between the electrical lines cause the lines to move towards and away from each other, creating vibrations at the frequency of the current and its harmonics. In the United States, these frequencies are 60, 120, 180, 240, 300, 360, 420, and so on. Because the electrical lines make contact with the pipe wall, the vibrations 15 propagate through the pipe wall, through the ground 14, to the surface of the ground 16. These vibrations can be detected with a sensor in contact with the pipe wall. However, because the vibrations also propagate into the soil in contact with the pipe, in many cases, the sensor does not need to be in contact with the pipe. In accordance with one embodiment of this invention, a sensor 17 attached to a tripod with three short spikes 18 is used to detect the vibrations. In accordance with one preferred embodiment of this invention, the sensor has a frequency range up to about 1000 Hz, although smaller or larger ranges may be employed. The tripod may be used on soil or on pavement. Properly designed spikes improve the coupling between the sensor and the ground/pavement. For soft soils, the tripod may be replaced with a single spike. In practice, to ensure which of two or more buried pipes in close proximity contains the electrical lines, at least some excavation should be performed. However, the removal of any pipe coatings which may be present is unnecessary. If the current is turned off, the vibrations will cease.

Many commercially available sensors contain a built-in amplifier that amplifies the signal for transmission over a cable 20 connecting the sensor 17 to the electronics used for signal processing and display. The signal from the sensor 17 passes through a power supply 21 to amplifier 23 to an analog-to-digital converter 25 to a digital signal processor 27. The digital signal processor analyzes the signals and displays an electric line present message on dot matrix display 29. It will be appreciated by those skilled in the art that the signal processing functions are available in discrete units or combined in a single package. For example, the analog-to-digital converter and the digital signal processor may be contained within a single unit, such as Texas Instruments MSP430F169. Alternatively, the electronics may be in a single package connected by a cable to the sensor, sensors and electronics may be in a single housing, or the sensors and electronics may be connected with a radio transmitter and receiver.

Suitable sensors for use in the method of this invention include an accelerometer, such as Wilcoxon Research Model 731-207, Wilcoxon Research Model 731A, or PCB Piezotronics Model 393M84. Suitable power supplies for the accelerometer include a Wilcoxon Research Model P-31 power unit/amplifier or a PCB Piezotronics Model 480E09, both of which contain amplifiers. Other sensors such as a MEMS accelerometer, a velocity sensor, or a geophone having sufficient sensitivity and a low enough instrumentation noise floor to detect the vibrations may be used.

Figure 2:
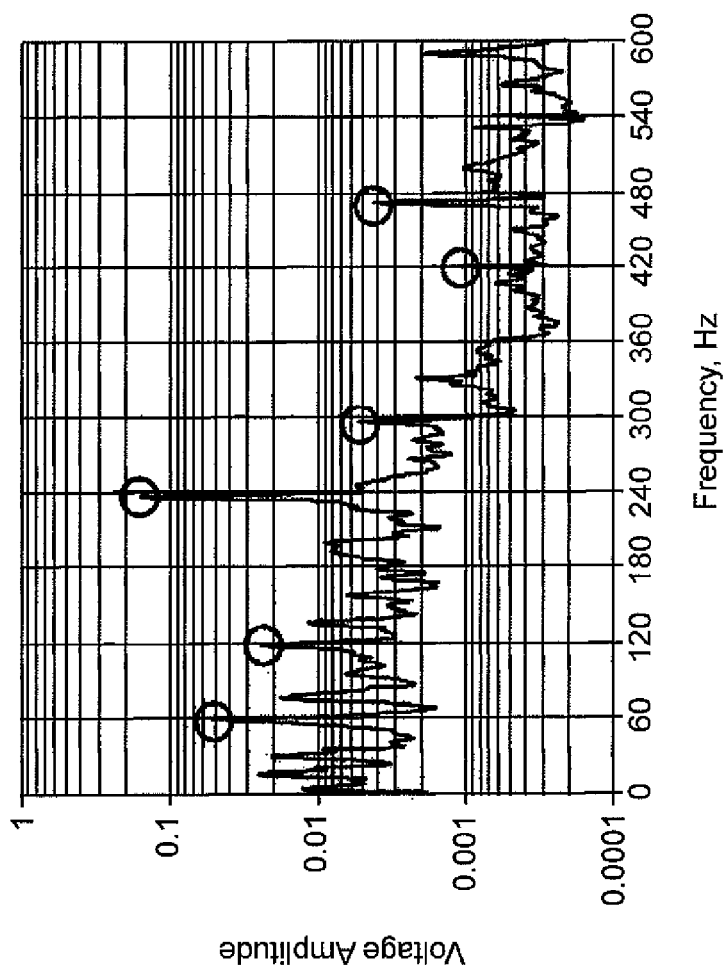
FIG. 2 is a diagram of a spectrum of vibrations generated by a 3-phase electrical line disposed inside an exposed pipe.
Figure 3:
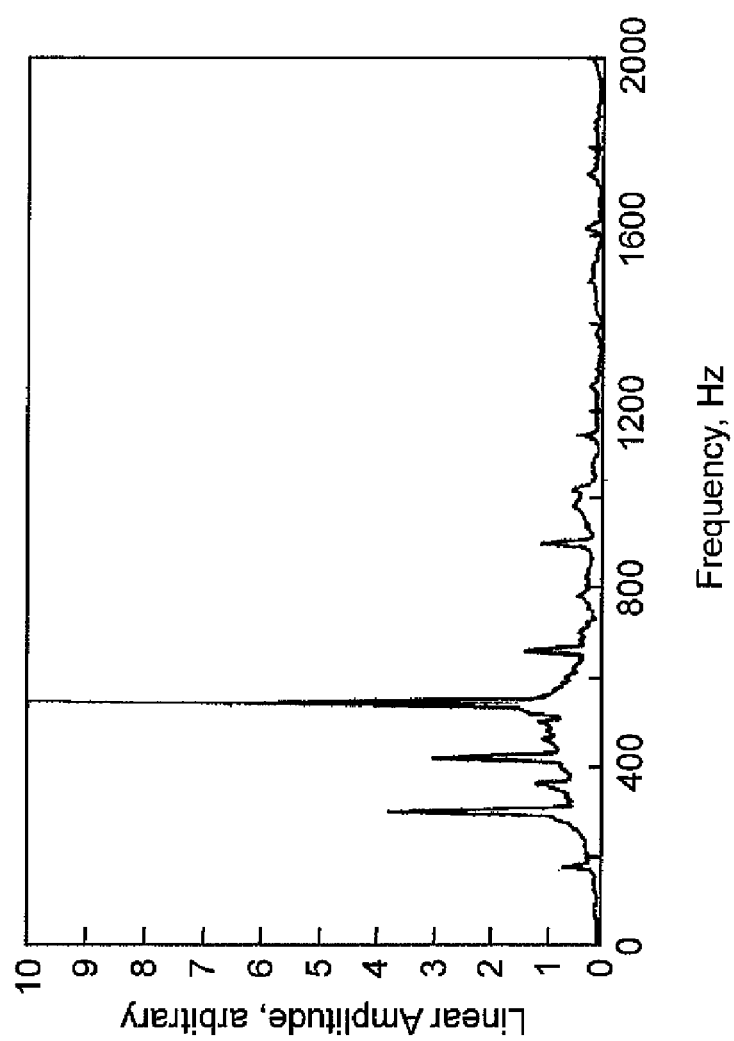
FIG. 3 is a diagram of a spectrum of vibrations from a buried pipe containing a 3-phase electrical line.
Figure 4:
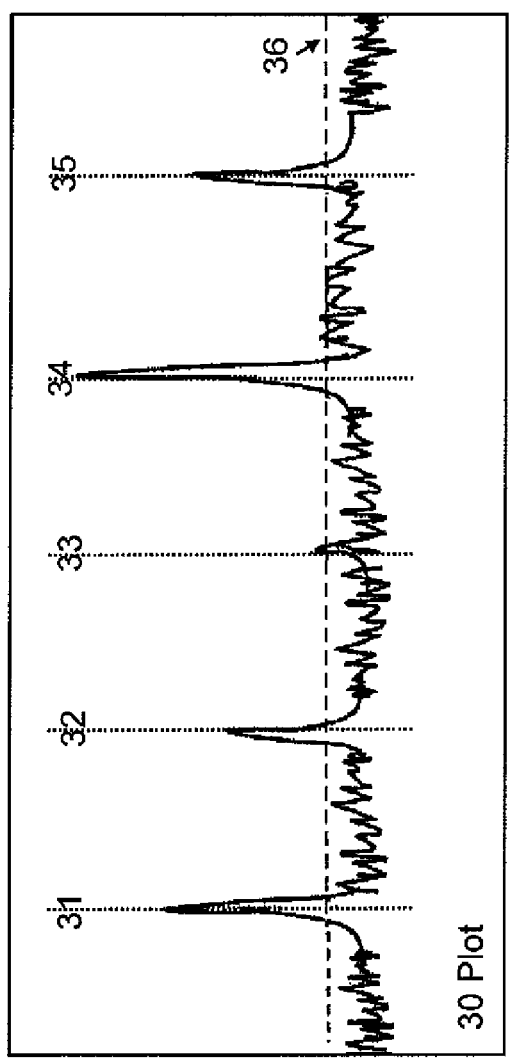
FIG. 4 is a diagram showing a spectrum illustrating the harmonic peaks and general background level obtained during performance of the method of this invention.
Figure 5:
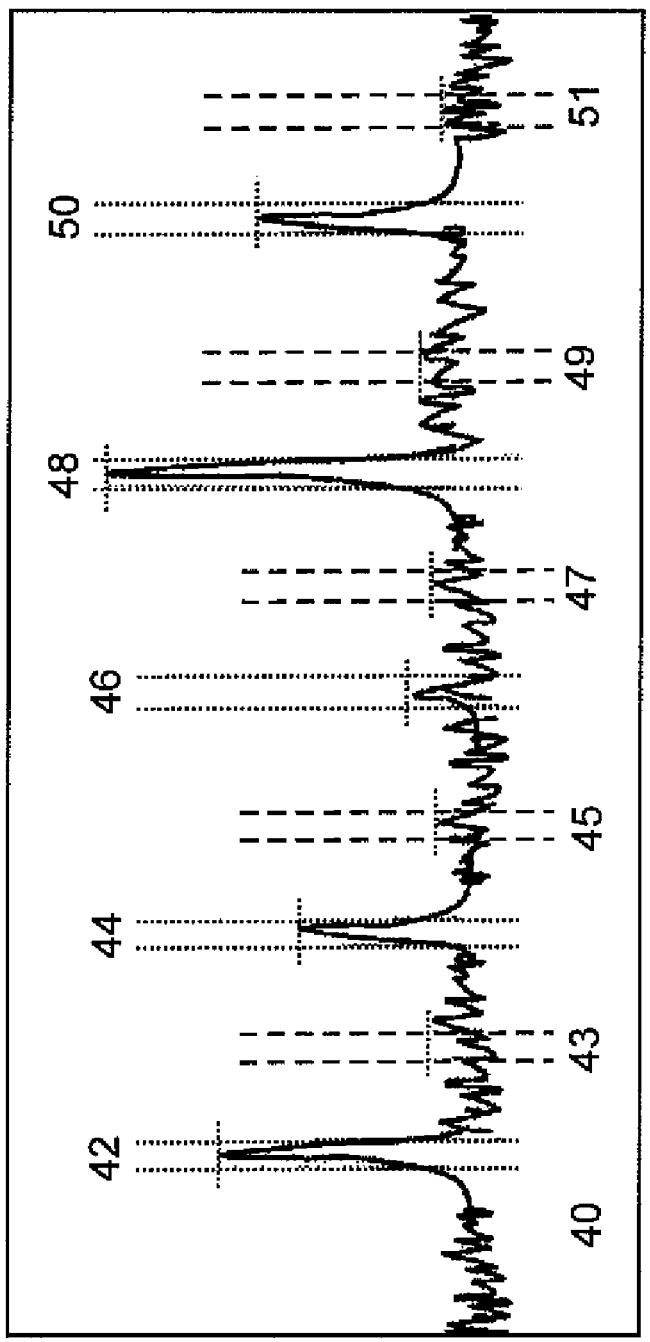
FIG. 5 is a diagram showing the spectrum of FIG. 4 with a preferred placement of filtering bands.

FIG. 2 shows the spectrum of a measurement on an exposed conduit carrying 3-phase current at 1200V where the sensor is in direct contact with the exposed conduit. As can be seen, several harmonics are present (the circled peaks). The peaks are at 60, 120, 240, 300, 420, and 480 Hz. By way of comparison, FIG. 3 shows a comparable spectrum from a buried conduit carrying 3-phase current. In this case, the sensor was not in contact with the pipe wall and the peaks are located at 180, 300, 420, 540, 660, and 900 Hz. FIG. 4 shows an idealized spectrum of vibrations where peak 31 is a fundamental current frequency and peaks 32, 33, 34, and 35 are current harmonic frequencies. The line 36 is a voltage level envelope above the background noise between the peaks. FIG. 5 is the same idealized spectrum showing analysis frequency bands 40 to 51.

The function of the electronics is to recognize the presence or lack of presence of the fundamental current frequency and one or more current harmonic peaks and their values above the corresponding background average, as shown in FIG. 5. There are a number of techniques known to those skilled in the art for making this determination. In accordance with one preferred embodiment, digital filtering is performed in each of the zones 42 through 51 and the amplitude of zones 42, 44, 46, 48, and 50 are compared to those of zones 43, 45, 47, 49, and 51, respectively. The harmonic peaks are coherent signals, whereas the signals in between the peaks are random and measure background noises.

FIG. 5 shows some of the sample frequency bands for the peaks. In accordance with one embodiment, the frequency bands are the fundamental current and current harmonic frequencies±10 Hz, e.g. 50-70, 110-130, 170-190, . . . , 950-970 Hz. A second set of frequency bands having the same bandwidth centered between the peaks of 80-100, 140-160, 200-220, . . . , 970-990 Hz is also selected. Although not required, the use of equal bandwidths simplifies the analysis. In this example, the voltage amplitude for each peak frequency is compared with the corresponding next higher background band, e.g. 50-70 Hz and 80-100 Hz. If three or more peak values exceed the corresponding background value by a factor of two or more, live electrical lines are present. Alternatively, adaptive filtering techniques may be used to identify the existence of the electrical lines.

Although the measurement of three or more peaks is preferred, any number of peaks may be employed. The relative amplitude of the peaks will vary from site to site depending on the coupling between the electrical lines and the pipe, and the attenuation of the soil. Some peaks may not be present or may be present with a much higher ratio to the adjacent bandwidth. In some cases, the fundamental current frequency may not be present. It will be appreciated by those skilled in the art that there are many methods for performing the analysis as well as many choices of bandwidth that may be used to identify the existence of the fundamental current frequency and the current frequency harmonics provided that the method of analysis allows for a variation in electrical line frequency. In the United States, electric utilities maintain the average current frequency at 60 Hz; however, the instantaneous current frequency varies by a few Hz. The key criteria for determining the presence of a live three-phase electrical line within a buried pipe in accordance with the method of this invention is the presence of a few peaks above the background noise.

As previously indicated, a unique feature of the method of this invention is the ability to detect live electrical wires disposed within a pipe from the outside of the pipe without penetrating the pipe wall. The advantages of a measurement tool employing the method of this invention include automated analysis of the data, thereby requiring no interpretation by the operator and little operator training, excavation and cleaning of the pipe required only to ensure that any closely buried pipes are distinguished, and portability due to the use of battery power and size which enables the tool to be held in one hand. Finally, by virtue of the fact that detection of live electrical wires disposed within a pipe in accordance with the method of this invention is performed entirely from outside the pipe, no pipe coatings are removed.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for determining a presence of live 3-phase electrical lines inside a buried pipe comprising the steps of:
   determining a location of a buried pipe from an aboveground location;
   providing a sensor suitable for detecting vibratory signals produced by a live 3-phase electrical line disposed within said buried pipe; and
   determining a presence of at least one of a current frequency signal or a current harmonic frequency signal, whereby said presence of said at least one of said current frequency signal or said current harmonic frequency signal corresponds to a presence of said live 3-phase electrical line.

2. The method of claim 1, wherein said sensor is selected from a group of sensors consisting of accelerometers, velocity sensors, and geophones.

3. The method of claim 1, wherein said location of said buried pipe is excavated, producing an exposed pipe, and said sensor is placed in direct contact with said exposed pipe.

4. The method of claim 1, wherein said sensor is at a distance from said buried pipe.

5. The method of claim 1, wherein said buried pipe is located by locating a peak amplitude in at least one of said current frequency signal or said current harmonic frequency signal.

6. The method of claim 1, wherein said sensor is coupled with a ground area proximate said location of said buried pipe.

7. The method of claim 1, wherein said current frequency signal and said current harmonic frequency signal are represented by peaks in a spectrum having values above a corresponding background average signal.

8. A method for determining a presence of live 3-phase electrical lines inside a buried pipe comprising the steps of
   determining a location of a buried pipe; and
   detecting a presence of at least one of a current frequency signal or a current harmonic frequency signal, said presence of at least one of said current frequency signal or said current harmonic frequency signal corresponding to a presence of a live 3-phase electrical line.

9. The method of claim 8, wherein said presence of said current frequency signal and said current harmonic frequency signal is determined from an above ground location without excavation of said buried pipe.

10. The method of claim 9, wherein said presence of said current frequency signal and said current harmonic frequency signal is determined using a vibratory sensor.

11. The method of claim 10, wherein said vibratory sensor is disposed on a ground area proximate said buried pipe.

12. The method of claim 10, wherein said sensor is selected from a group of sensors consisting of accelerometers, velocity sensors, and geophones.

13. The method of claim 10, wherein said location of said buried pipe is excavated, producing an exposed pipe, and said sensor is placed in direct contact with said exposed pipe.

14. The method of claim 8, wherein said buried pipe is located by locating a peak amplitude in at least one of said current frequency signal or said current harmonic frequency signal.

* * * * *